United States Patent
Nabeshima et al.

(10) Patent No.: US 6,673,754 B1
(45) Date of Patent: Jan. 6, 2004

(54) NONFLAMMABLE WATER-BASED CUTTING FLUID COMPOSITION AND NONFLAMMABLE WATER-BASED CUTTING FLUID

(75) Inventors: Toshikazu Nabeshima, Kyoto (JP); Kaori Sugiyama, Kyoto (JP); Hitoshi Shinike, Shiga (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 10/236,899

(22) Filed: Sep. 6, 2002

(30) Foreign Application Priority Data

| Sep. 7, 2001 | (JP) | ........................ | 2001/271539 |
| Sep. 7, 2001 | (JP) | ........................ | 2001-271553 |

(51) Int. Cl.$^7$ .................... C10M 173/02; C10M 145/16
(52) U.S. Cl. ...................... 508/507; 508/136; 508/143; 508/154; 508/506; 508/512; 72/42
(58) Field of Search .................. 508/506, 507

(56) References Cited

U.S. PATENT DOCUMENTS

| 3,177,146 A | * | 4/1965 | Francis ........................ 252/75 |
| 3,629,112 A | | 12/1971 | Gower et al. |
| 4,461,712 A | * | 7/1984 | Jonnes ........................ 508/507 |
| 4,765,917 A | * | 8/1988 | Otaki et al. .................. 508/121 |
| 4,853,140 A | | 8/1989 | Payne et al. |
| 5,616,544 A | * | 4/1997 | Kalota et al. ................ 508/508 |
| 6,221,814 B1 | * | 4/2001 | Kaburagi et al. ........... 508/136 |
| 6,602,834 B1 | * | 8/2003 | Ward et al. .................. 508/506 |

FOREIGN PATENT DOCUMENTS

| EP | 08057847 | 5/1996 |
| FR | 882 051 B1 | 5/1942 |

OTHER PUBLICATIONS

European Search Report for Application No. EP 02 25 6127; searched in The Hague, Dec. 12, 2002.

* cited by examiner

*Primary Examiner*—Ellen M. McAvoy
(74) *Attorney, Agent, or Firm*—Marshall, Gerstein & Borun LLP

(57) ABSTRACT

The present invention provides a nonflammable water-based cutting fluid composition which affords excellent dispersion property of abrasives, which does not cause problems involving in flammability upon the use for cutting process of a hard and brittle materials, which can be readily washed, and which can achieve sufficient rust preventive property even if it is used in an equipment for oil use. Provided by the present invention is a nonflammable water-based cutting fluid composition containing a polycarboxylic acid-based polymer compound and/or a salt thereof having a weight-average molecular weight of 1,000–200,000, and additionally a carboxylic acid and/or a salt thereof upon needs for a rust preventive property.

37 Claims, No Drawings

NONFLAMMABLE WATER-BASED CUTTING FLUID COMPOSITION AND NONFLAMMABLE WATER-BASED CUTTING FLUID

BACKGROUND OF THE INVENTION

1. Field of The Invention

The present invention relates to nonflammable water-based cutting fluid compositions and nonflammable water-based cutting fluids. More particularly, the present invention relates to water-based cutting fluids which are suitable for cutting process of single-crystal silicon and polycrystalline silicon that are crystal materials for semiconductors as well as ingots such as quartz, crystalline quartz, ceramics and the like, and to nonflammable water-based cutting fluids in a slurry state including the above water-based cutting fluids blended with abrasives. In addition, the present invention also relates to nonflammable water-based cutting fluid compositions and nonflammable water-based cutting fluids which are available in equipments for oil use.

2. Description of the Related Art

Conventionally, nonaqueous cutting fluids have been employed, which predominantly contain mineral oil in major proportions as a dispersion medium of abrasives in cutting fluids for use in cutting hard and brittle materials such as silicon ingots. This type of nonaqueous cutting fluids are in a slurry state in which abrasives such as silicon carbide is dispersed in cutting oil at a ratio of 1:1 on the basis of weight. This slurry is continuously supplied onto a surface subjected to cutting process. For the washes of the wafer which was thus cut out, cleaning liquids, e.g., a chlorinated organic solvent such as trichloroethane, methylene chloride and the like, and a nonionic surfactant with a high concentration have been used.

However, mineral oil is a dangerous substance having inflammability. Therefore, a facility equipped with an explosion-proof measure is required, restriction of quantity which can be stored is obliged, and problems can be caused involving in environmental conservation and manufacturing management. Furthermore, such cleaning liquids as chlorinated organic solvent described above for use in washing the wafer, which had been cut using mineral oil, may be a cause of cancer, problems involving in safety and health may be raised. Furthermore, these liquids have been recently prohibited because they may be main causes of air pollution and depletion of ozone layer. As an alternative washing solution of those, nonionic surfactant has been used, however, the nonionic surfactants necessitate a large scaled washing equipment due to their low washability, and moreover, problems in waste water treatment and disposal treatment have been raised because the surfactant must be used at a high concentration.

On the other hand, there have been proposed water soluble cutting fluids of water soluble glycol type which predominantly contains water soluble ethers of polyoxyalkylene glycol and derivatives thereof (see, JP-A-3-181598 and JP-A-11-198016) as a cutting fluid which allows washing with water after the cutting process.

However, the water soluble cutting fluids of glycol type necessitate the blending of water for disappearance of a flash point, and thus there arise problems in the manufacture and control thereof, e.g., lowered content of water results in the appearance of flash point; and blending water in a higher amount results in the deteriorated dispersion property of abrasives. In addition, even though the water soluble cutting fluids of glycol type can be readily washed with water, it is accompanied by higher loading of waste water, and problems have still remained in waste water treatment. Furthermore, when water soluble cutting fluids are introduced in the conventional equipments in which mineral oil-based cutting fluids were used, rust gathers, and therefore, investments have been required for e.g., improvement of the equipment and introduction of a dedicated equipment.

SUMMARY OF THE INVENTION

The present invention was accomplished taking into account of these conventional problems, and enables to provide nonflammable water-based cutting fluid compositions and nonflammable water-based cutting fluids which are excellent in dispersion property of abrasives also in a composition blended with a large amount of water, which are not accompanied by problems of flammability also for use in cutting process of hard and brittle materials, and which can be readily washed with water and satisfactory in waste water treatment property, through the use of a specified polycarboxylic acid-based polymer compound. In addition, to provide nonflammable water-based cutting fluid compositions and nonflammable water-based cutting fluids was allowed, which can exert rust preventive effects even if they are used in an equipment for oil use through the use of a specified carboxylic acid and/or a salt thereof.

Specifically, the nonflammable water-based cutting fluid composition according to the present invention is characterized in that it contains 5–45% by weight of a polycarboxylic acid-based polymer and/or a salt thereof compound having a weight-average molecular weight of 1,000–200,000.

The polycarboxylic acid-based polymer compound is believed to adsorb the abrasives, thereby exerting a stable dispersion effect through a protective colloid effect. Further, much greater dispersion property is achieved by the generation of electrostatic repulsive force due to ionicity imparted to a salt of a polycarboxylic acid-based polymer compound.

When the molecular weight of this polycarboxylic acid-based polymer compound is lower than 1,000, uniform protective colloid layer is not formed on the surface of the grains, and thus repulsive force among the grains are weakened. Accordingly, dispersion property and redispersion property are believed to be deteriorated. Further, when the molecular weight is greater than 200,000, agglomeration arises, and which may result in lowering of redispersion property.

The polycarboxylic acid-based polymer compound and/or a salt thereof described above is preferably selected from the group consisting of: a polymer prepared from one or more monomers selected from the group consisting of acrylic acid, maleic acid and methacrylic acid; an alkaline metal salt of said polymer; an onium salt of said polymer; and a mixture of one or more of the same.

Further, the polycarboxylic acid-based polymer compound and/or a salt thereof described above is preferably a polymer represented by the general formula (1).

In the general formula (1), R represents a hydrogen atom or a methyl group, M1, M2, and M3 are any one of a hydrogen atom, an alkaline metal atom or onium, which may be the same or different each other. The symbol n is an integer equal to or greater than 1, and m is an integer equal to or greater than 0.

The nonflammable water-based cutting fluid composition according to the present invention may further contain at least one additive auxiliary agent selected from the group consisting of a water soluble solvent, a lubricant, a viscosity adjusting agent, anti-corrosive agent for nonferrous metals and antifoaming agent. Among those, one or more water soluble solvents selected from polyoxyalkylene glycol or derivatives thereof are preferably contained as the additive auxiliary agent.

In addition, the nonflammable water-based cutting fluid composition according to the present invention may contain the carboxylic acid and/or a salt thereof described above at 0.05–5% by weight. The carboxylic acid and a salt thereof is added for enhancing the rust preventive function.

The carboxylic acid and/or a salt thereof is preferably selected from the group consisting of aliphatic dicarboxylic acids represented by the general formula (2), alkaline metal salts of said aliphatic dicarboxylic acids and onium salts of said aliphatic dicarboxylic acids. In the general formula (2), k is an integer of 6–12.

The nonflammable water-based cutting fluid according to the present invention is characterized in that it contains the above-described nonflammable water-based cutting fluid composition and abrasives.

In this fluid, the grain diameter of the above-descried abrasives is preferably 0.5–50 μm. Further, a cutting fluid including the nonflammable water-based cutting fluid composition and the abrasives in a weight ratio of 1:0.5–1:1.5 is preferred with the abrasives being dispersed in the fluid composition.

Such a nonflammable water-based cutting fluid according to the present invention is suitably used for a wire saw and a band saw. In particular, it is suitably used for cutting ingots consisting of a hard and brittle material. Exemplary hard and brittle materials described above include those selected from silicon, quartz and crystalline quartz.

Because the nonflammable water-based cutting fluid composition according to the present invention contains a polycarboxylic acid-based polymer compound and/or a salt thereof, and a carboxylic acid and/or a salt thereof, dispersion property of the abrasives becomes excellent even if the composition is blended with a large amount of water, and problems involving in flammability are not caused upon the use for cutting process of a hard and brittle material. Moreover, the nonflammable water-based cutting fluid composition according to the present invention has a high rust preventive property, no rust gathers when it is used in an equipment for oil use. In addition, it is enabled to be readily flushed away upon washes with water.

Moreover, because the nonflammable water-based cutting fluid for the equipment for oil use according to the present invention is blended with abrasives in the composition described above, it can be continuously supplied to a cutting equipment such as wire saw, band saw and the like to permit cutting of a wafer with a high accuracy of finishing. Examples of the polycarboxylic acid-based polymer compound which can be used in the present invention include homopolymers or copolymers of acrylic acid, maleic acid or methacrylic acid; or copolymers thereof with ethylene, propylene, styrene, methacrylate ester, maleate monoester, maleate diester, vinyl acetate or the like. In addition, alkaline metal salts and/or onium salts of the above-described polycarboxylic acid-based polymer compound can be also used. Salts herein include: salts of a metal ion such as sodium, potassium, lithium and the like; and salts of onium ion such as ammonia, monoethanolamine, diethanolamine, triethanolamine, methylamine, dimethylamine, trimethylamine, ethylamine, diethylamine, triethylamine, methylethanolamine, dimethylethanolamine, methyldiethanolamine, ethylethanolamine, diethylethanolamine, ethyldiethanolamine and the like. Among these salts, salts of sodium, potassium, ammonia, monoethanolamine and diethanolamine are preferred.

Among the polycarboxylic acid-based polymer compounds listed above, particularly suitably used compounds include alkaline metal salts and/or onium salts of the homopolymer of acrylic acid and/or the copolymer of acrylic acid and maleic acid represented by the general formula (1) as referred to above.

Weight-average molecular weight of the polycarboxylic acid-based polymer compound and/or a salt thereof is preferably 1,000–200,000, however, those having a weight-average molecular weight of 5,000–20,000 can be readily dealt with, and give proper viscosity when an aqueous solution is prepared. When the molecular weight is less than 1,000, dispersion capability of the abrasives is unsatisfactory, and thus the content thereof of greater than 50% by weight is required, which elevates the loading of waste water. When the molecular weight is greater than 200,000, it is necessary to decrease the content so that the proper viscosity can be achieved, additionally, dispersion property of the abrasives is deteriorated.

Lower limit of the content of the polycarboxylic acid-based polymer compound and/or a salt thereof is 5% by weight or greater, and preferably 20% by weight or greater, whilst upper limit thereof is 45% by weight or less, and preferably 40% by weight or less. When the content is less than 5% by weight, sufficient abrasive dispersion property is not achieved. When the content thereof is greater than 45% by weight, viscosity of the cutting fluid is elevated, and thus mixing of the abrasives becomes difficult with making continuous supply of the cutting fluid to a cutting device impossible.

The nonflammable water-based cutting fluid composition according to the present invention can be blended with a carboxylic acid and/or a salt thereof in order to attain a rust preventive property. Examples of the carboxylic acid used in the present invention include aliphatic monocarboxylic acid such as propanoic acid, butanoic acid, pentanoic acid, hexanoic acid, heptanoic acid, octanoic acid, nonanoic acid, decanoic acid, undecanoic acid, dodecanoic acid, tetradecanoic acid, heptadecanoic acid, octadecanoic acid, oleic acid and the like; aromatic monocarboxylic acid such as o-methylbenzoic acid (toluic acid), m-methylbenzoic acid, p-methylbenzoic acid, o-ethylbenzoic acid, m-ethylbenzoic acid, p-ethylbenzoic acid, o-propylbenzoic acid, m-propylbenzoic acid, p-propylbenzoic acid, p-t-butylbenzoic acid, naphthalenecarboxylic acid and the like; aliphatic dicarboxylic acid such as oxalic acid, malonic acid, succinic acid, glutaric acid, adipic acid, heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid, pentadecanedioic acid, hexadecanedioic acid and the like; aromatic dicarboxylic acid such as phthalic acid, isophthalic acid, terephthalic acid and the like. Additionally, alkaline metal salts and onium salts of these carboxylic acids can be also used. Exemplary types of the salts include salts of metal ion such as sodium, potassium, lithium and the like; and salts of onium ion such as ammonia, monoethanolamine, diethanolamine, triethanolamine, methylamine, dimethylamine, trimethylamine, ethylamine, diethylamine, triethylamine, methylethanolamine, dimethylethanolamine, methyldiethanolamine, ethylethanolamine, diethylethanolamine, ethyldiethanolamine and the like. Among these salts, salts of sodium, potassium, ammonia, monoethanolamine and diethanolamine are preferred.

Examples of particularly suitable carboxylic acid are alkaline metal salts and ammonium salts of aliphatic dicarboxylic acid represented by the general formula (2), and neutralized products of an alkanolamine salt. Specifically, included are sodium salts of octanedioic acid (suberic acid), nonanedioic acid (azelaic acid), decanedioic acid (sebacic acid), undecanedioic acid, dodecanedioic acid, tridecanedioic acid, tetradecanedioic acid and the like; and diethanolamine salts and the like. These have low foaming property, and do not require the addition of an antifoaming agent as an additive auxiliary agent.

Lower limit of the content of the carboxylic acid and/or a salt thereof is 0.05% by weight or greater, and preferably 0.2% by weight or greater, whilst upper limit thereof is 5% by weight or less, and preferably 2% by weight or less. When the content is less than 0.05% by weight, sufficient rust preventive property is not achieved. When the content thereof is greater than 5% by weight, dispersion property is lowered, and thus mixing of the abrasives becomes difficult with making continuous supply of the cutting fluid to a cutting device impossible.

Water content upon blending into the nonflammable water-based cutting fluid may be 55–95% by weight when a carboxylic acid and/or a salt thereof is not blended. Water content of less than 55% by weight is not preferable because uniform dissolution of the polycarboxylic acid salt-based polymer compound becomes impossible. In addition, by blending moisture in an amount in the range 55–95% by weight, removal of the nonflammable water-based cutting fluid in the form of slurry according to the present invention is allowed by water alone when the cut article (e.g., wafer or the like) post cutting is washed, and thus facilitated washing is enabled.

In cases where a carboxylic acid and/or a salt thereof is blended, water content upon blending into a flammable water-based cutting fluid is 50% by weight or greater. Less than 50% by weight is not preferred, because uniform dissolution of polycarboxylic acid salt-based polymer compound becomes impossible. Furthermore, blending moisture in a content of 50% by weight or greater allows removal of the nonflammable water-based cutting fluid in the form of slurry according to the present invention by washes with water alone of the cut article (e.g., wafer or the like) post cutting, and thus facilitated washing is enabled. Moreover, the cutting fluid in which a carboxylic acid and/or a salt thereof is blended is preferably adjusted to pH 7–9 through converting to a neutralized salt. In an acidic area of less than or equal to pH 4, rust gathering is observed on iron type materials.

To the contrary, in an alkaline area of equal to or above pH 10, hands may get rough and dry upon contact to the hands.

The nonflammable water-based cutting fluid according to the present invention may be blended with various types of additive auxiliary agents as desired. Examples of such additive auxiliary agents include a water soluble solvent, a lubricant, a viscosity adjusting agent, an anticorrosion agent for nonferrous metals, an antifoaming agent and the like.

Examples of water soluble solvent include ethylene glycol, diethylene glycol, triethylene glycol, propylene glycol, dipropylene glycol, tripropylene glycol, hexylene glycol, glycerol, polyethylene glycol, polypropylene glycol, polyethylene glycol-polypropylene glycol copolymer, hexylene glycol, 1,3-propanediol, 1,4-butanediol, 1,6-hexanediol, pentaerythritol, sorbitol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, propylene glycol monomethyl ether, dipropylene glycol monomethyl ether, tripropylene glycol monomethyl ether and mixtures thereof. Further, lubricants may include for example, nonionic surfactant, anionic surfactant, fatty acid, fatty acid polycondensation products. Viscosity adjusting agents may include for example, bentonite, water-based silicasol, polyvinyl pyrrolidone, carboxy methylcellulose and the like. Anticorrosion agents for nonferrous metals include for example, benzotriazole type compounds. Antifoaming agents include for example, compounds of silicone, acetylenediol, polyglycol, or alcohols. Particularly suitable additive auxiliary agents are polyoxyalkylene glycol type solvents such as ethylene glycol, diethylene glycol, propylene glycol and the like, which are water soluble solvents. These are effective in preventing sedimentation of abrasives.

Abrasive for dispersing into the nonflammable water-based cutting fluid according to the present invention is not particularly limited, which includes silicon carbide, aluminum oxide, zirconium oxide, silicon dioxide, cesium dioxide, diamond and the like. Average particle size of the abrasives is preferably 0.5–50 $\mu$m, and is more preferably 5–30 $\mu$m. When average particle size of abrasives is greater than 50 $\mu$m, sedimentation rate of the abrasives becomes too high, and thus dispersion may be difficult. Further, less than 0.5 $\mu$m of average particle size of abrasives is not preferred because cutting ability of the cutting fluid is decreased. Lower limit of ratio of the abrasives to be blended to 1 of the nonflammable water-based cutting fluid is 0.5 (ratio in weight base) or greater, and preferably 0.8 or greater. Additionally, upper limit of the abrasives to be blended is 1.5 (ratio in weight base) or less, and preferably 1.2 or less. When the ratio of abrasives to be blended is less than 0.5, the amount of the abrasives in slurry is too small, which necessitates long period of time for cutting process. To the contrary, greater than 1.5 of the ratio of abrasives to be blended is not preferred, because dispersion property of the abrasives is inferior, and continuous supply of the cutting fluid in the form of slurry according to the present invention to a cutting device also becomes difficult.

The nonflammable water-based cutting fluid according to the present invention is used for cutting hard and brittle materials. Although this hard and brittle material is not particularly limited, the fluid can be suitably used for hard and brittle materials such as single-crystal silicon, polycrystalline silicon, quartz, crystalline quartz, glass, gallium-arsenic, ceramics and the like. More preferably, it is applied to single-crystal silicon ingot or quartz (crystalline quartz) ingot. Furthermore, nonflammable water-based cutting fluid according to the present invention is available for any types of cutting devices as long as free abrasives are used therein, and hard and brittle materials are subjected to cutting. Preferable cutting device includes for example, wire saw, band saw and the like.

DESCRIPTION OF THE PREFERRED EMBODIMENTS

Next, the present invention is explained with Examples and Comparative Examples, however, these Examples should not be construed as limiting the present invention.

EXAMPLES 1–14 AND COMPARATIVE EXAMPLES 1–7

Examples and Comparative Examples are explained below for cutting fluid compositions and cutting fluids in which a carboxylic acid and/or a salt thereof is not blended.

Each of the components illustrated in Table 1 and Table 2 was blended in a ratio as described, and thus cutting fluid compositions were obtained. To the resulting cutting fluid composition were added abrasives to prepare cutting fluids. Accordingly, dispersion property, redispersion property, viscosity change, accuracy of cutting process, washability and waste water treatment property of each of the cutting fluids were examined as described below. The results thus obtained are shown in Table 3 and Table 4.

TABLE 1

| Cutting fluid composition | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Polyacrylate salts based polymer compound | Acrylic acid homopolymer having an average molecular weight of 5000 | 20 | | | | | | | | | | | | | |
| | Acrylic acid-maleic acid copolymer having an average molecular weight of 8000 | | 15 | | | | | | | | | | | | |
| | Na acrylate homopolymer having an average molecular weight of 4000 | | | 35 | | | | | | | | | | | |
| | $NH_4$ acrylate homopolymer having an Average molecular weight of 160000 | | | | 30 | | | | | | | | | | |
| | Na acrylate homopolymer having an average molecular weight of 10000 | | | | | 32 | | | | | | | | | |
| | $NH_4$ acrylate homopolymer having an average molecular weight of 10000 | | | | | | 35 | | | | | | | | |
| | Na acrylate homopolymer having an average molecular weight of 140000 | | | | | | | 30 | | | | | | | |
| | Diethanol amine salt of acrylic acid homopolymer having an average molecular weight of 150000 | | | | | | | | 25 | | | | | | |
| | K acrylate homopolymer having an average molecular weight of 5000 | | | | | | | | | 40 | | | | | |
| | Na acrylate-Na maleate copolymer having an average molecular weight of 20000 | | | | | | | | | | 35 | | | | |
| | Na acrylate-Na methacrylate copolymer having an average molecular weight of 50000 | | | | | | | | | | | 35 | | | |
| | Na maleate-Na methacrylate copolymer having an average molecular weight of 100000 | | | | | | | | | | | | 35 | | |
| | Styrene-Na maleate copolymer having an average molecular weight of 7000 | | | | | | | | | | | | | 45 | |
| | Butyl acrylate-Na methacrylate copolymer having an average molecular weight of 30000 | | | | | | | | | | | | | | 45 |
| | Na acrylate homopolymer having an average molecular weight of 900 | | | | | | | | | | | | | | |
| | Na acrylate homopolymer having an average molecular weight of 250000 | | | | | | | | | | | | | | |
| Polyethylene glycol (average molecular weight: 400) | | | | | | | | | | | | | | | |
| Water | | 80 | 85 | 65 | 70 | 68 | 65 | 70 | 75 | 60 | 65 | 65 | 65 | 55 | 55 |
| Bentonite | | | | | | | | | | | | | | | |
| Commercially available mineral oil-based cutting fluid (manufactured by Palace Kagaku Kabushikikaisya, Trade Name: PS-LW-1) | | | | | | | | | | | | | | | |

TABLE 2

| | | Comparative Example | | | | | | |
|---|---|---|---|---|---|---|---|---|
| Cutting fluid composition | | 1 | 2 | 3 | 4 | 5 | 6 | 7 |
| Polyacrylate salts based polymer compound | Acrylic acid homopolymer having an average molecular weight of 5000 | | | | | | | |
| | Acrylic acid-maleic acid copolymer having an average molecular weight of 8000 | | | | | | | |
| | Na acrylate homopolymer having an average molecular weight of 4000 | | | | | | 0.1 | |
| | $NH_4$ acrylate homopolymer having an average molecular weight of 160000 | | | | | | | |
| | Na acrylate homopolymer having an average molecular weight of 10000 | 4 | 50 | | | | | |
| | $NH_4$ acrylate homopolymer having an average molecular weight of 10000 | | | | | | | |
| | Na acrylate homopolymer having an average molecular weight of 140000 | | | | | | | |
| | Diethanol amine salt of acrylic acid homopolymer having an average molecular | | | | | | | |

TABLE 2-continued

| Cutting fluid composition | Comparative Example | | | | | | |
|---|---|---|---|---|---|---|---|
| | 1 | 2 | 3 | 4 | 5 | 6 | 7 |
| weight of 150000 | | | | | | | |
| K acrylate homopolymer having an average molecular weight of 5000 | | | | | | | |
| Na acrylate-Na maleate copolymer having an average molecular weight of 20000 | | | | | | | |
| Na acrylate-Na methacrylate copolymer having an average molecular weight of 50000 | | | | | | | |
| Na maleate-Na methacrylate copolymer having an average molecular weight of 100000 | | | | | | | |
| Styrene-Na maleate copolymer having an average molecular weight of 7000 | | | | | | | |
| Butyl acrylate-Na methacrylate copolymer having an average molecular weight of 30000 | | | | | | | |
| Na acrylate homopolymer having an average molecular weight of 900 | | | 40 | | | | |
| Na acrylate homopolymer having an average molecular weight of 250000 | | | | 20 | | | |
| Polyethylene glycol (average molecular weight: 400) | | | | | 91 | 40 | |
| Water | 96 | 50 | 60 | 80 | 8 | 19 | |
| Bentonite | | | | | 1 | | |
| Ethylene glycol | | | | | | 40 | |
| Synthetic hectoliter (manufactured by Nihon Silica Kogyo, grain diameter: 0.02 im) | | | | | | 0.9 | |
| Commercially available mineral oil-based cutting fluid (manufactured by Palace Kagaku Kabushikikaisya, Trade name: PS-LW-1) | | | | | | | 100 |

Dispersion Property and Redispersion Property of Abrasives

To a 1,000 ml plastic vessel were charged 500 g of the cutting fluid composition listed in Table 1 and Table 2 and 500 g of abrasives of silicon carbide (GP#800, Fujimi, Inc.), and the mixture was stirred at a rotation speed of 3,000 rpm for 3 minutes at room temperature (25° C.) using a homodisperser (Tokusyu Kika Kogyo Inc.) to give a nonflammable water-based cutting fluid in a uniform slurry state.

One hundred ml of this water-based cutting fluid was placed in 100 ml Nessler tube (diameter: 24 mm, length: 200 mm), and measurement of the volume of abrasives in a lower layer and observation of sedimentation states were conducted at each time point of 1 hour, 6 hours, 24 hours and 48 hours after beginning to stand still. When the volume of a lower layer is great, the amount of its upper separated water is small, and accordingly, an evaluation for excellent dispersion property of the abrasives can be made.

To evaluate redispersion property of abrasives, the Nessler tube containing the slurry was horizontally inclined at 48 hours after beginning to stand still, and the following criteria were adopted for the evaluation.

⊚ . . . Entire layer of abrasives smoothly flows;
○ . . . Entire layer of abrasives slowly flows;
Δ . . . Only upper part of abrasives flows;
X . . . Layer of abrasives scarcely flows.

As is clear from Table 3 and Table 4, nonflammable water-based cutting fluid of each of the Examples exhibited stable dispersion effects comparable to mineral oil-based cutting fluid (Comparative Example 7). This finding suggests that the polycarboxylic acid-based polymer compound blended in each of the nonflammable water-based cutting fluids of the Examples formed a protective colloid through adsorption to the abrasives. In addition, because alkaline metal salts and onium salts of the polycarboxylic acid-based polymer compound have ionicity, it is believed that electrostatic repulsive force may be exerted to give much better dispersion property. When the polycarboxylic acid-based polymer compound has a molecular weight of not more than the specified value, or when the content thereof is small, uniform protective colloid layer cannot be formed on the surface of grains. Accordingly, repulsive force between the granules is believed to decline, and thus dispersion property and redispersion property would be deteriorated. Moreover, when the polycarboxylic acid-based polymer compound has a molecular weight of greater than the 200000, agglomeration occurs, which results in deterioration of redispersion property.

Viscosity Change

To a 1,000 ml plastic vessel were charged 500 g of the cutting fluid composition listed in Table 1 and Table 2 and 500 g of abrasives of silicon carbide (GP#800, Fujimi, Inc.), and the mixture was stirred at a rotation speed of 3,000 rpm for 3 minutes at room temperature (25° C.) using a homodisperser (Tokusyu Kika Kogyo Inc.) to give a nonflammable water-based cutting fluid in a uniform slurry state. Viscosity of this water-based cutting fluid was measured at 25° C. with BM viscometer. Next, the fluid was stirred at a rotation speed of 10,000 rpm using a homomixer equipped with a disper blade for 1 hour, and was adjusted to a temperature of 25° C. Thereafter, the viscosity of the mixture was measured. Viscosity change was determined for the rate of change between before and after the stirring= (viscosity after 1 hour stirring at 10,000 rpm)/(viscosity before the stirring), and influences of shearing force were examined. As the rate of change is closer to 1, viscosity change upon cutting ingots and the like is smaller, thereby indicating availability of stable processing characteristics.

As is clear from Table 3 and Table 4, when the nonflammable water-based cutting fluid of each of the Examples is used, less viscosity change is exhibited in comparison with the case where the cutting fluid of Comparative Examples is used. It is revealed that the nonflammable water-based cutting fluid of each of the Examples has equal or greater stability in comparison with the mineral oil-based cutting fluid (Comparative Example 7).

Accuracy of Cutting Process

Cutting fluid composition and abrasives of silicon carbide (GP#800, Fujimi, Inc.) listed in Table 1 and Table 2 were mixed with stirring at 1:1 (weight ratio) to give a nonflammable water-based cutting fluid in a uniform slurry state. Cutting process was conducted using this cutting fluid with a wire saw cutting device of which wire diameter being 180 μm for a single-crystal silicon ingot having a diameter of 6 inches, and accuracy of cutting process for the cut wafer was evaluated.

The accuracy of cutting process was determined through measuring warp of the wafer (WARP, maximum value of the differences of heights of total 5 points including those in center parts and in marginal parts). Average values for ten wafers were found, and accuracy of cutting process was evaluated according to the following criteria.

◎ . . . equal to or greater than 0 μm—less than 10 μm;

○ . . . equal to or greater than 10 μm—less than 20 μm;

Δ . . . equal to or greater than 20 μm–less than 30 μm; and

X . . . greater than 30 μm.

As is clear from Table 3 and Table 4, when the nonflammable water-based cutting fluid of each of the Examples is used, accuracy of cutting process was more excellent in comparison with the case where the cutting fluid of Comparative Examples is used. It is revealed that the nonflammable water-based cutting fluid of each of the Examples can exhibit equal or greater accuracy of cutting process in comparison with the mineral oil-based cutting fluid (Comparative Example 7).

Washability

To a 1,000 ml plastic vessel were charged 500 g of the cutting fluid composition listed in Table 1 and Table 2 and 500 g of abrasives of silicon carbide (GP#800, Fujimi, Inc.), and the mixture was stirred at a rotation speed of 3,000 rpm for 3 minutes at room temperature (25° C.) using a homomixer equipped with a disper blade to give a nonflammable water-based cutting fluid in a uniform slurry state.

The cutting fluid described above was coated on a silicon wafer and a quartz wafer, and dried at 80° C. for one hour. Accordingly, a mimetic post cutting process sample was obtained. The wafer of this mimetic sample was washed with running water (at room temperature, 25° C.) for 3 minutes, and was evaluated on washability according to the criteria below.

○ . . . washable without residual abrasives; and

X . . . not washable with remaining abrasives.

As is clear from Table 3 and Table 4, when the nonflammable water-based cutting fluid of each of the Examples is used, equal or greater washability could be achieved in comparison with the case where the cutting fluid of Comparative Examples is used for either sample of the silicon wafer or the quartz wafer. Further, it was impossible to wash the mineral oil-based cutting fluid (Comparative Example 7) with water, and thus the evaluation of washability was X. In this case, abrasives could not be removed at all, thereby revealing clearly inferior washability of this Comparative Example in comparison with each of the Examples.

Waste Water Treatment Property

A 0.1% aqueous solution of the cutting fluid composition listed in Table 1 and Table 2 was prepared, and chemical oxygen demand (COD) and biochemical oxygen demand (BOD) were measured for each solution. Waste water treatment property was evaluated according to the criteria below.

○ . . . less than 1,000 mg/l of COD and BOD; and

X . . . greater than 1,000 mg/l of COD and BOD.

As is clear from Table 3 and Table 4, when the nonflammable water-based cutting fluid of each of the Examples is used, more excellent waste water treatment property could be demonstrated in comparison with the case where the cutting fluid of Comparative Examples is used. Further, the mineral oil-based cutting fluid (Comparative Example 7) is treated as an industrial waste, and therefore is not capable of being subjected to waste water treatment. Taking into account of costs for the treatment and influences on the environment, advantages of each of the Examples are evident.

TABLE 3

| Cutting fluid composition | | Dispersion property of abrasives | | | | Redispersion property | Viscosity change | Cutting process Accuracy | Washability Silicon wafer | Washability Quartz wafer | Waste water treatment property |
|---|---|---|---|---|---|---|---|---|---|---|---|
| | | 1 h | 12 h | 24 h | 48 h | 48 h | | | | | |
| Example | 1 | 95 | 79 | 72 | 67 | ○ | 1.2 | ○ | ○ | ○ | ○ |
| | 2 | 96 | 80 | 73 | 67 | ○ | 1.2 | ○ | ○ | ○ | ○ |
| | 3 | 97 | 82 | 73 | 67 | ◎ | 1.1 | ◎ | ○ | ○ | ○ |
| | 4 | 97 | 85 | 75 | 69 | ◎ | 1.0 | ◎ | ○ | ○ | ○ |
| | 5 | 100 | 89 | 75 | 70 | ◎ | 1.0 | ◎ | ○ | ○ | ○ |
| | 6 | 100 | 89 | 75 | 70 | ◎ | 1.0 | ◎ | ○ | ○ | ○ |
| | 7 | 99 | 88 | 75 | 70 | ◎ | 1.0 | ◎ | ○ | ○ | ○ |
| | 8 | 99 | 88 | 75 | 70 | ◎ | 1.0 | ◎ | ○ | ○ | ○ |
| | 9 | 98 | 87 | 75 | 69 | ◎ | 1.0 | ◎ | ○ | ○ | ○ |
| | 10 | 99 | 87 | 75 | 70 | ◎ | 1.0 | ◎ | ○ | ○ | ○ |
| | 11 | 98 | 87 | 75 | 69 | ◎ | 1.0 | ◎ | ○ | ○ | ○ |
| | 12 | 98 | 86 | 74 | 68 | ◎ | 1.0 | ◎ | ○ | ○ | ○ |
| | 13 | 97 | 85 | 74 | 68 | ◎ | 1.0 | ◎ | ○ | ○ | ○ |
| | 14 | 98 | 85 | 74 | 68 | ◎ | 1.0 | ◎ | ○ | ○ | ○ |

TABLE 4

| Cutting fluid composition | | Dispersion property of abrasives | | | | Redispersion property 48 h | Viscosity change | Cutting process Accuracy | Washability | | Waste water treatment property |
|---|---|---|---|---|---|---|---|---|---|---|---|
| | | 1 h | 12 h | 24 h | 48 h | | | | Silicon wafer | Quartz wafer | |
| Comparative Example | 1 | 50 | 50 | 50 | 50 | x | 0.3 | x | ○ | ○ | ○ |
| | 2 | 72 | 65 | 60 | 50 | Δ | 5.0 | x | x | x | ○ |
| | 3 | 50 | 50 | 50 | 50 | x | 0.4 | x | ○ | ○ | ○ |
| | 4 | 70 | 62 | 58 | 50 | x | 8.5 | x | x | x | ○ |
| | 5 | 80 | 68 | 59 | 50 | Δ | 2.5 | Δ | x | x | x |
| | 6 | 73 | 65 | 60 | 50 | ○ | 1.9 | x | ○ | ○ | x |
| | 7 | 99 | 88 | 74 | 68 | ○ | 1.3 | ○ | x | x | x (nonaqueous) |

(EXAMPLES 15–32 AND COMPARATIVE EXAMPLES 8–17)

Examples and Comparative Examples are explained below for cutting fluid compositions and cutting fluids in which a carboxylic acid and/or a salt thereof is blended.

Each of the components illustrated in Table 5 and Table 6 was blended in a ratio as described, and thus cutting fluid compositions were obtained. To the resulting cutting fluid composition were added abrasives to prepare cutting fluids. Accordingly, dispersion property, redispersion property, viscosity change, accuracy of cutting process, washability and rust preventive property of each of the cutting fluids were examined as described below. The results thus obtained are shown in Table 7 and Table 8.

TABLE 5

| Cutting fluid composition | | Example | | | | | | | | | | | | | | | | | |
|---|---|---|---|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 | 29 | 30 | 31 | 32 |
| Polyacrylate salts based polymer compound | Acrylic acid homopolymer having an average molecular weight of 5000 | 15 | | | | | | | | | | | | | | | | | |
| | Acrylic acid-maleic acid copolymer having an average molecular weight of 8000 | | 10 | | | | | | | | | | | | | | | | |
| | Na acrylate homopolymer having an average molecular weight of 4000 | | | 30 | | | | | | | | | | | | | | | |
| | $NH_4$ acrylate homopolymer having an average molecular weight of 160000 | | | | 25 | | | | | | | | | | | | | | |
| | Na acrylate homopolymer having an average molecular weight of 10000 | | | | | 30 | | | | | | | | | | 15 | 45 | 30 | 30 |
| | $NH_4$ acrylate homopolymer having an average molecular weight of 10000 | | | | | | 30 | | | | | | | | | | | | |
| | Na acrylate homopolymer having an average molecular weight of 140000 | | | | | | | 25 | | | | | | | | | | | |
| | Diethanol amine salt of acrylic acid homopolymer having an average molecular weight of 150000 | | | | | | | | 20 | | | | | | | | | | |
| | K acrylate homopolymer having an average molecular weight of 5000 | | | | | | | | | 35 | | | | | | | | | |
| | Na acrylate-Na maleate copolymer having an average molecular weight of 20000 | | | | | | | | | | 30 | | | | | | | | |
| | Na acrylate-Na methacrylate copolymer having an average molecular weight of 50000 | | | | | | | | | | | 30 | | | | | | | |
| | Na maleate-Na methacrylate copolymer having an average molecular weight of 100000 | | | | | | | | | | | | 30 | | | | | | |
| | Styrene-Na maleate copolymer having an average molecular weight of 7000 | | | | | | | | | | | | | 30 | | | | | |
| | Butyl acrylate-Na methacrylate copolymer having an average molecular weight of 30000 | | | | | | | | | | | | | | 30 | | | | |
| | Na acrylate homopolymer having an average molecular weight of | | | | | | | | | | | | | | | | | | |

TABLE 5-continued

| Cutting fluid composition | | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|
| | 900 | | | | | | | | | | | | | | | | | | |
| | Na acrylate homopolymer having an average molecular weight of 250000 | | | | | | | | | | | | | | | | | | |
| | Nonanoic acid | 1 | | | | | | | | | | | | | | | | | |
| | Triethanolamine salt of decanoic acid | | 1 | | | | | | | | | | | | | | | | |
| | Na salt of p-t-butylbenzoic acid | | | 0.5 | | | | | | | | | | | | | | | |
| | Diethanolamine salt of sebacic acid | | | | | 1 | | | | 1 | 1 | 1 | 1 | 1 | 1 | 1 | 1 | 1 | 3 |
| | Na salt of dodecanedioic acid | | | | | | 0.5 | 1 | 2 | | | | | | | | | 0.3 | |
| Ethylene glycol | | | | | | | 10 | | 10 | | 10 | | 5 | 15 | | 25 | 3 | 15 | 15 |
| Propylene glycol | | | | | | | | 10 | | 10 | | 10 | | | 5 | 15 | | | |
| Polyethylene glycol (average molecular weight: 400) | | | | | | | | | | | | | | | | | | | |
| Water | | 84 | 89 | 70 | 74 | 60 | 59 | 63 | 69 | 54 | 59 | 64 | 54 | 64 | 54 | 59 | 51 | 55 | 52 |
| Bentonite | | | | | | | | | | | | | | | | | | | |
| Monoethanolamine | | | | | | | | | | | | | | | | | | | |
| Commercially available mineral oil-based cutting fluid (manufactured by Palace Kagaku Kabushikikaisya, Trade name: PS-LW-1) | | | | | | | | | | | | | | | | | | | |

TABLE 6

| Cutting fluid composition | | 8 | 9 | 10 | 11 | 12 | 13 | 14 | 15 | 16 | 17 |
|---|---|---|---|---|---|---|---|---|---|---|---|
| Polyacrylate salts based polymer compound | Acrylic acid homopolymer having an average molecular weight of 5000 | | | | | | | | | | |
| | Acrylic acid-maleic acid copolymer having an average molecular weight of 8000 | | | | | | | | | | |
| | Na acrylate homopolymer having an average molecular weight of 4000 | | | | | | | | | 0.1 | |
| | NH$_4$ acrylate homopolymer having an average molecular weight of 160000 | | | | | | | | | | |
| | Na acrylate homopolymer having an average molecular weight of 10000 | 3 | 50 | | | 30 | 30 | 30 | | | |
| | NH$_4$ acrylate homopolymer having an average molecular weight of 10000 | | | | | | | | | | |
| | Na acrylate homopolymer having an average molecular weight of 140000 | | | | | | | | | | |
| | Diethanolamine salt of acrylic acid homopolymer having an average molecular weight of 150000 | | | | | | | | | | |
| | K acrylate homopolymer having an average molecular weight of 5000 | | | | | | | | | | |
| | Na acrylate-Na maleate copolymer having an average molecular weight of 20000 | | | | | | | | | | |
| | Na acrylate-Na methacrylate copolymer having an average molecular weight of 50000 | | | | | | | | | | |
| | Na maleate-Na methacrylate copolymer having an average molecular weight of 100000 | | | | | | | | | | |
| | Styrene-Na maleate copolymer having an average molecular weight of 7000 | | | | | | | | | | |
| | Butyl acrylate-Na methacrylate copolymer having an average molecular weight of 30000 | | | | | | | | | | |
| | Na acrylate homopolymer having an average molecular weight of 900 | | | | 40 | | | | | | |
| | Na acrylate homopolymer having an average molecular weight of 250000 | | | | | 20 | | | | | |
| | Nonanoic acid | | | | | | | | | | |
| | Triethanolamine salt of decanoic acid | | | | | | | | | | |
| | Na salt of p-t-butylbenzoic acid | | | | | | | | | | |
| | Diethanolamine salt of sebacic acid | | | 1 | | 1 | | | 5.5 | | 1 |
| | Na salt of dodecanedioic acid | | | 1 | | 1 | 0.02 | | 1 | | |
| Ethylene glycol | | | | | | | | | | | |
| Propylene glycol | | | | | | | | | | 80 | |
| Polyethylene glycol (average molecular weight: 400) | | | | | | | | | | 90 | |
| Water | | 96 | 49 | 59 | 79 | 69 | 70 | 64.5 | 8 | 19 | |
| Bentonite | | | | | | | | | | 1 | |
| Monoethanolamine | | | | | | | 1 | | | | |

TABLE 6-continued

|  | Comparative Example | | | | | | | | | |
|---|---|---|---|---|---|---|---|---|---|---|
| Cutting fluid composition | 8 | 9 | 10 | 11 | 12 | 13 | 14 | 15 | 16 | 17 |
| Synthetic hectoliter (manufactured by Nihon Silica Kogyo, grain diameter: 0.02 im) | | | | | | | | | 0.9 | |
| Commercially available mineral oil-based cutting fluid (manufactured by Palace Kagaku Kabushikikaisya, Trade name: PS-LW-1) | | | | | | | | | | 100 |

Dispersion Property and Redispersion Property of Abrasives

In a similar manner to those for Examples 1–14 and Comparative Examples 1–7 described above, examination of dispersion property and redispersion property of abrasives was conduced.

As is clear from the results shown in Table 7 and Table 8, nonflammable water-based cutting fluid of each of the Examples exhibited stable dispersion effects comparable to mineral oil-based cutting fluid (Comparative Example 17). This finding suggests that the polycarboxylic acid-based polymer compounds blended in each of nonflammable water-based cutting fluids of the Examples formed a protective colloid through adsorption to the abrasives. In addition, because alkaline metal salts and onium salts of the polycarboxylic acid-based polymer compound have ionicity, it is believed that electrostatic repulsive force may be exerted to give much better dispersion property. When the polycarboxylic acid-based polymer compound has a molecular weight of not more than the specified value, or when the content thereof is small, uniform protective colloid layer cannot be formed on the surface of grains. Accordingly, repulsive force between the granules is believed to decline, and thus dispersion property and redispersion property would be deteriorated. Moreover, when the polycarboxylic acid-based polymer compound has a molecular weight of greater than the 200,000, agglomeration occurs, which results in deterioration of redispersion property.

Viscosity Change

In a similar manner to those for Examples 1–14 and Comparative Examples 1–7 described above, examination of viscosity change was conducted.

As is clear from the results shown in Table 7 and Table 8, when the nonflammable water-based cutting fluid of each of the Examples is used, less viscosity change is exhibited in comparison with the case where the cutting fluid of Comparative Examples is used. It is revealed that the nonflammable water-based cutting fluid of each of the Examples has equal or greater stability in comparison with the mineral oil-based cutting fluid (Comparative Example 17).

Accuracy of Cutting Process

In a similar manner to those for Examples 1–14 and Comparative Examples 1–7 described above, examination of accuracy of cutting process was conducted.

As is clear from the results shown in Table 7 and Table 8, when the nonflammable water-based cutting fluid of each of the Examples is used, accuracy of cutting process was more excellent in comparison with the case where the cutting fluid of Comparative Examples is used. It is revealed that the nonflammable water-based cutting fluid of each of the Examples can exhibit equal or greater accuracy of cutting process in comparison with the mineral oil-based cutting fluid (Comparative Example 17).

Washability

In a similar manner to those for Examples 1–14 and Comparative Examples 1–7 described above, examination of washability was conducted.

As is clear from the results shown in Table 7 and Table 8, when the nonflammable water-based cutting fluid of each of the Examples is used, equal or greater washability could be achieved in comparison with the case where the cutting fluid of Comparative Examples is used for either sample of the silicon wafer or the quartz wafer. Further, it was impossible to wash the mineral oil-based cutting fluid (Comparative Example 17) with water, and thus the evaluation of washability was x. In this case, abrasives could not be removed at all, thereby revealing clearly inferior washability of this Comparative Example in comparison with each of the Examples Rust Preventive Property To cast iron powder (FC20) were added 2 ml of the cutting fluid listed in Table 5 and Table 6 dropwise, and the states of rust gathering at room temperature were determined on 3 hours, day 1 and day 3. In particular, the states of rust gathering were compared according to the criteria below.

⊚ . . . no rust;

○ . . . area with rust of less than 5%; and

Δ . . . area with rust of equal to or greater than 5%, and less than 25%; and

X . . . area with rust of greater than 25%

As is clear from the results shown in Table 7 and Table 8, when the nonflammable water-based cutting fluid of each of the Examples is used, equal or greater rust preventive property could be achieved in comparison with the case where the cutting fluid of Comparative Examples is used. It is revealed that the nonflammable water-based cutting fluid of each of the Examples exerts equal or nearly equal rust preventive property in comparison with the mineral oil-based cutting fluid (Comparative Example 17).

TABLE 7

| Cutting fluid composition | | Dispersion property of abrasives | | | | Redispersion property 48 h | Viscosity change | Cutting process Accuracy | Washability Silicon wafer | Washability Quartz wafer | Rust preventive property 3 h | Rust preventive property Day 1 | Rust preventive property Day 3 |
|---|---|---|---|---|---|---|---|---|---|---|---|---|---|
| | | 1 h | 12 h | 24 h | 48 h | | | | | | | | |
| Example | 15 | 90 | 78 | 70 | 65 | ○ | 1.3 | ○ | ○ | ○ | ◎ | ○ | △ |
| | 16 | 90 | 77 | 70 | 65 | ○ | 1.3 | ○ | ○ | ○ | ◎ | ○ | △ |
| | 17 | 91 | 78 | 71 | 65 | ○ | 1.3 | ○ | ○ | ○ | ◎ | ○ | △ |
| | 18 | 91 | 78 | 72 | 66 | ○ | 1.3 | ○ | ○ | ○ | ◎ | ◎ | ◎ |
| | 19 | 100 | 88 | 75 | 69 | ◎ | 1.0 | ◎ | ○ | ○ | ◎ | ◎ | ◎ |
| | 20 | 100 | 87 | 75 | 68 | ◎ | 1.0 | ◎ | ○ | ○ | ◎ | ◎ | ◎ |
| | 21 | 98 | 87 | 75 | 68 | ◎ | 1.0 | ◎ | ○ | ○ | ◎ | ◎ | ◎ |
| | 22 | 98 | 86 | 74 | 68 | ◎ | 1.0 | ◎ | ○ | ○ | ◎ | ◎ | ◎ |
| | 23 | 98 | 84 | 74 | 68 | ◎ | 1.0 | ◎ | ○ | ○ | ◎ | ◎ | ◎ |
| | 24 | 97 | 85 | 75 | 68 | ◎ | 1.1 | ◎ | ○ | ○ | ◎ | ◎ | ◎ |
| | 25 | 97 | 85 | 75 | 68 | ◎ | 1.1 | ◎ | ○ | ○ | ◎ | ◎ | ◎ |
| | 26 | 97 | 85 | 75 | 68 | ◎ | 1.1 | ◎ | ○ | ○ | ◎ | ◎ | ◎ |
| | 27 | 93 | 80 | 72 | 67 | ○ | 1.3 | ○ | ○ | ○ | ◎ | ◎ | ◎ |
| | 28 | 93 | 81 | 73 | 67 | ○ | 1.3 | ○ | ○ | ○ | ◎ | ◎ | ◎ |
| | 29 | 90 | 78 | 71 | 65 | ○ | 1.3 | ○ | ○ | ○ | ◎ | ○ | △ |
| | 30 | 91 | 79 | 72 | 66 | ○ | 1.3 | ○ | ○ | ○ | ◎ | ◎ | ○ |
| | 31 | 93 | 80 | 73 | 67 | ○ | 1.3 | ○ | ○ | ○ | ◎ | ○ | △ |
| | 32 | 93 | 80 | 72 | 66 | ○ | 1.3 | ○ | ○ | ○ | ◎ | ◎ | ◎ |

TABLE 8

| Cutting fluid composition | | Dispersion property of abrasives | | | | Redispersion property 48 h | Viscosity change | Cutting process Accuracy | Washability Silicon wafer | Washability Quartz wafer | Rust preventive property 3 h | Rust preventive property Day 1 | Rust preventive property Day 3 |
|---|---|---|---|---|---|---|---|---|---|---|---|---|---|
| | | 1 h | 12 h | 24 h | 48 h | | | | | | | | |
| Comparative Example | 8 | 50 | 50 | 50 | 50 | x | 0.2 | x | ○ | ○ | ◎ | ◎ | ◎ |
| | 9 | 71 | 63 | 58 | 50 | △ | 5.5 | x | x | x | ◎ | ◎ | ◎ |
| | 10 | 50 | 50 | 50 | 50 | x | 0.4 | x | ○ | ○ | ◎ | ◎ | ◎ |
| | 11 | 68 | 60 | 55 | 50 | x | 9.2 | x | x | x | ◎ | ◎ | ◎ |
| | 12 | 80 | 71 | 60 | 52 | x | 5.2 | x | ○ | ○ | △ | x | x |
| | 13 | 100 | 88 | 75 | 68 | ◎ | 1.0 | △ | x | x | x | x | x |
| | 14 | 62 | 55 | 50 | 50 | x | 10.8 | x | x | x | ◎ | ◎ | ◎ |
| | 15 | 80 | 68 | 59 | 50 | △ | 2.5 | △ | x | x | △ | △ | x |
| | 16 | 73 | 65 | 60 | 50 | ◎ | 1.9 | x | ○ | ○ | x | x | x |
| | 17 | 99 | 88 | 74 | 68 | ◎ | 1.3 | ○ | x | x | ◎ | ◎ | ◎ |

What is claimed is:

1. A nonflammable water-based cutting fluid composition comprising 5–45% by weight of a polycarboxylic acid-based polymer compound and/or a salt thereof having a weight-average molecular weight of 1,000–200,000.

2. The nonflammable water-based cutting fluid composition according to claim 1 wherein the polycarboxylic acid-based polymer compound and/or a salt thereof is a polymer, or alkaline metal salt thereof, or onium salt thereof, or mixture prepared from one or more monomers selected from the group consisting of acrylic acid, maleic acid, and methacrylic acid.

3. The nonflammable water-based cutting fluid composition according to claim 2 wherein the polycarboxylic acid-based polymer compound and/or a salt thereof is a polymer represented by the general formula (1):

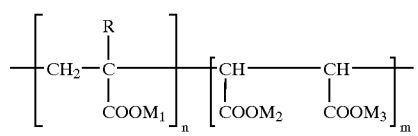

(1)

wherein R represents a hydrogen atom or a methyl group; M1, M2 and M3 are any one of a hydrogen atom, an alkaline metal atom or onium, which may be the same or different; n is an integer equal to or greater than 1; and m is an integer equal to or greater than 0.

4. The nonflammable water-based cutting fluid composition according to claim 1 further comprising at least one additive auxiliary agent selected from the group consisting of a water soluble solvent; a lubricant; a viscosity adjusting agent; an anticorrosion agent for nonferrous metals; and an antifoaming agent.

5. The nonflammable water-based cutting fluid composition according to claim 4 wherein the auxiliary agent comprises one or more water soluble solvents selected from the group consisting of a polyoxyalkylene glycol, a derivative of a polyoxylalkylene glycol, and a combination thereof.

6. The nonflammable water-based cutting fluid composition according to claim 1, further comprising 0.05–5% by weight of a compound selected from the group consisting of a carboxylic acid, a carboxylic acid salt, and a combination thereof.

7. The nonflammable water-based cutting fluid composition according to claim 6, wherein the compound of a carboxylic acid and/or a salt thereof is selected from the group consisting of:

an aliphatic dicarboxylic acid represented by the general formula (2):

wherein k is an integer of 6–12;
an alkaline metal salt of said aliphatic dicarboxylic acid; and an onium salt of said aliphatic dicarboxylic acid.

8. The nonflammable water-based cutting fluid composition according to claim 7,
wherein the polycarboxylic acid-based polymer compound and/or a salt thereof has a weight-average molecular weight of 5,000–150,000, and is selected from the group consisting of an alkaline metal salt of a homopolymer of acrylic acid; an onium salt of a homopolymer of acrylic acid; an alkaline metal salt of a copolymer of acrylic acid and maleic acid; and an onium salt of a copolymer of acrylic acid and maleic acid, wherein the amount of said polycarboxylic acid-based polymer compound and/or a salt thereof is 20–40% by weight of the composition;
wherein the carboxylic acid and/or a salt thereof is selected from the group consisting of an aliphatic dicarboxylic acid represented by the general formula (2);

wherein k is an integer of 6–12; an alkaline metal salt of said aliphatic dicarboxylic acid; and an onium salt of said aliphatic dicarboxylic acid; and wherein the amount of said carboxylic acid and/or a salt thereof is 0.5–2% by weight of the composition; and
wherein the composition further comprises an additive auxiliary agent which is a water soluble solvent selected from the group consisting of a polyoxyalkylene glycol; a derivative of a polyoxyalkylene glycol; and a combination thereof; and the amount of said water soluble solvent is 5–20% by weight of the composition.

9. A nonflammable water-based cutting fluid comprising a nonflammable water-based cutting fluid composition according to claim 1 further including one or more particulate abrasive materials.

10. The nonflammable water-based cutting fluid according to claim 9 wherein the abrasive material has a grain diameter of 0.5–50 μm.

11. The nonflammable water-based cutting fluid according to claim 9 comprising the nonflammable water-based cutting fluid composition according to claim 1 and a particulate abrasive material in a weight ratio of cutting fluid composition:abrasive material in the range of 1:0.5–1:1.5, with the abrasive material being dispersed in the cutting fluid composition.

12. The nonflammable water-based cutting fluid composition according to claim 2 further comprising at least one additive auxiliary agent selected from the group consisting of a water soluble solvent, a lubricant, a viscosity adjusting agent, an anticorrosion agent for nonferrous metals and an antifoaming agent.

13. The nonflammable water-based cutting fluid composition according to claim 3 further comprising at least one additive auxiliary agent selected from the group consisting of a water soluble solvent, a lubricant, a viscosity adjusting agent, an anticorrosion agent for nonferrous metals and an antifoaming agent.

14. The nonflammable water-based cutting fluid composition according to claim 12 wherein the auxiliary agent comprises one or more water soluble solvents selected from the group comprising of a polyoxyalkylene glycol, a derivative of a polyoxyalkylene glycol, and a combination thereof.

15. The nonflammable water-based cutting fluid composition according to claim 13 wherein the auxiliary agent comprises one or more water soluble solvents selected from the group consisting of a polyoxyalkylene glycol, a derivative of a polyoxyalkylene glycol, and a combination thereof.

16. The nonflammable water-based cutting fluid composition according to claim 2 further comprising 0.05–5% by weight of a compound selected from the group consisting of a carboxylic acid, a carboxylic acid salt, and a combination thereof.

17. The nonflammable water-based cutting fluid composition according to claim 3 further comprising 0.05–5% by weight of a compound selected from the group consisting of a carboxylic acid, a carboxylic acid salt, and a combination thereof.

18. The nonflammable water-based cutting fluid composition according to claim 16 wherein the compound of a carboxylic acid and/or salt thereof is selected from the group consisting of an aliphatic dicarboxylic acid represented by the general formula (2):

wherein k is an integer in the range of 6–12; an alkaline metal salt of said aliphatic dicarboxylic acid; and an onium salt of said aliphatic dicarboxylic acid.

19. The nonflammable water-based cutting fluid composition according to claim 17 wherein the compound of a carboxylic acid and/or a salt thereof is selected from the group consisting of:
an aliphatic dicarboxylic acid represented by the general formula (2):

wherein k is an integer in the range of 6–12; an alkaline metal salt of said aliphatic dicarboxylic acid; and an onium salt of said aliphatic dicarboxylic acid.

20. The nonflammable water-based cutting fluid composition according to claim 18,
wherein the polycarboxylic acid-based polymer compound and/or a salt thereof has a weight-average molecular weight of 5,000–150,000, and is selected from the group consisting of an alkaline metal salt of a homopolymer of acrylic acid; an onium salt of a homopolymer of acrylic acid; an alkaline metal salt of a copolymer of acrylic acid and maleic acid; and an onium salt of a copolymer of acrylic acid and maleic acid; and wherein the amount of said polycarboxylic acid-based polymer compound and/or a salt thereof is 20–40% by weight of the composition;
wherein the carboxylic acid and/or a salt thereof is selected from the group consisting of an aliphatic dicarboxylic acid represented by the general formula (2);

wherein k is an integer of 6–12; an alkaline metal salt of said aliphatic dicarboxylic acid; and an onium salt of said aliphatic dicarboxylic acid; and wherein the amount of said carboxylic acid and/or a salt thereof is 0.5–2% by weight of the composition; and wherein the composition further comprises an additive auxiliary agent which is a water soluble solvent selected from the group consisting of a polyoxyalkylene glycol; a derivative of a polyoxyalkylene glycol; and a combination thereof; and wherein the amount of said water soluble solvent is 5–20% by weight of the composition.

21. The nonflammable water-based cutting fluid composition according to claim 19, wherein the polycarboxylic acid-based polymer compound and/or a salt thereof has a weight-average molecular weight of 5,000–150,000, and is selected from the group consisting of an alkaline metal salt of a homopolymer of acrylic acid; an onium salt of a homopolymer of acrylic acid; an alkaline metal salt of a copolymer of acrylic acid and maleic acid; and an onium salt of a copolymer of acrylic acid and maleic acid; and wherein the amount of said polycarboxylic acid-based polymer compound and/or a salt thereof is 20–40% by weight of the composition;

wherein the carboxylic acid and/or a salt thereof is selected from the group consisting of an aliphatic dicarboxylic acid represented by the general formula (2);

wherein k is an integer of 6–12; an alkaline metal salt of said aliphatic dicarboxylic acid; and an onium salt of said aliphatic dicarboxylic acid; and wherein the amount of said carboxylic acid and/or a salt thereof is 0.5–2% by weight of the composition; and wherein the composition further comprises an additive auxiliary agent which is a water soluble solvent selected from the group consisting of a polyoxyalkylene glycol; a derivative of a polyoxyalkylene glycol; and a combination thereof; and the amount of said water soluble solvent is 5–20% by weight of the composition.

22. A nonflammable water-based cutting fluid comprising a nonflammable water-based cutting fluid composition according to claim 2, further including one or more particulate abrasive materials.

23. A nonflammable water-based cutting fluid comprising a nonflammable water-based cutting fluid composition according to claim 3, further including one or more particulate abrasive materials.

24. The nonflammable water-based cutting fluid according to claim 22 wherein the abrasive material has a grain diameter of 0.5–50 µm.

25. The nonflammable water-based cutting fluid according to claim 23 wherein the abrasive material has a grain diameter of 0.5–50 µm.

26. The nonflammable water-based cutting fluid according to claim 22 comprising the nonflammable water-based cutting fluid composition according to claim 2 and the particulate abrasive material in a weight ration of cutting fluid composition: abrasive material in the range of 1:0.5–1:2.5, with the abrasive material being dispersed in the cutting fluid composition.

27. The nonflammable water-based cutting fluid according to claim 23 comprising the nonflammable water-based cutting fluid composition according to claim 3 and the particulate abrasive material in a weight ration of cutting fluid composition: abrasive material in the range of 1:0.5–1:1.5, with the abrasive material being dispersed in the cutting fluid composition.

28. A method of cutting an object with a wire saw comprising continuously supplying the object with the cutting fluid of claim 9 while cutting the object with the wire saw.

29. A method of cutting an object with a wire saw comprising continuously supplying the object with the cutting fluid of claim 10 while cutting the object with the wire saw.

30. A method of cutting an object with a wire saw comprising continuously supplying the object with the cutting fluid of claim 11 while cutting the object with the wire saw.

31. A method of cutting an object with a band saw comprising continuously supplying the object with the cutting fluid of claim 9 while cutting the object with the band saw.

32. A method of cutting an object with a band saw comprising continuously supplying the object with the cutting fluid of claim 10 while cutting the object with the band saw.

33. A method of cutting an object with a band saw comprising continuously supplying the object with the cutting fluid of claim 11 while cutting the object with the band saw.

34. A method of cutting a hard, brittle ingot formed of a material selected from the group consisting of silicon; quartz; and crystalline quartz comprising continuously supplying the ingot with the cutting fluid of claim 9 while cutting the ingot with an ingot cutting device.

35. A method of cutting a hard, brittle ingot formed of a material selected from the group consisting of silicon; quartz; and crystalline quartz comprising continuously supplying the ingot with the cutting fluid of claim 10 while cutting the ingot with an ingot cutting device.

36. A method of cutting a hard, brittle ingot formed of a material selected from the group consisting of silicon; quartz; and crystalline quartz comprising continuously supplying the ingot with the cutting fluid of claim 11 while cutting the ingot with an ingot cutting device.

37. A method of cutting a hard, brittle ingot formed of a material selected from the group consisting of silicon; quartz; and crystalline quartz comprising continuously supplying the ingot with the cutting fluid of claim 12 while cutting the ingot with an ingot cutting device.

* * * * *